Patented Dec. 22, 1925.

1,566,592

UNITED STATES PATENT OFFICE.

ADAM GONDERMAN, OF LA VERNE, CALIFORNIA.

BELT DRESSING.

No Drawing.　　　Application filed May 1, 1925. Serial No. 27,310.

*To all whom it may concern:*

Be it known that I, ADAM GONDERMAN, a citizen of the United States, residing at La Verne, in the county of Los Angeles and State of California, have invented certain new and useful Improvements in Belt Dressings, of which the following is a specification.

This invention appertains to a novel compound for treating the surfaces of drive belts and the like and the primary object of the invention is to provide a dressing for belts, which can be easily applied to the belt and which will effectively prevent the belt from slipping, when the same is in use.

Another object of the invention is to provide a novel belt dressing, which not only acts to prevent the slipping of the belt in use, but which also acts as means for preserving the belt and for preventing undue wear thereon.

A still further object of the invention is to provide a novel compound for a belt dressing, in which the ingredients are easy to obtain, simple to combine, the ingredients allowing the compound to be placed upon the market at a small cost.

With these and other objects in view, the invention consists in the provision of a novel formula for belt dressings as will now be described.

In accordance with this invention, I use a vehicle of extra heavy lubricating oil with which is combined rosin and bees wax. As stated the lubricating oil forms a vehicle for the rosin and the wax adds a body to the compound. The rosin held in the lubricating oil forms an effective means for preventing the slipping of the belt. The use of the oil and bees wax is beneficial to the belt and prevents the belt from cracking. Further the oil and wax provide protecting coat for the belt and prevents undue wear thereon.

I prefer to use the following amount of the ingredients:

One quart of extra heavy lubricating oil,
Two pounds of rosin,
Three ounces of bees wax.

The rosin and the bees wax are placed directly in the oil and the oil is placed upon a suitable stove and allowed to boil until the rosin and the bees wax are dissolved. The entire mixture is now allowed to boil approximately fifteen minutes until the same begins to foam after which the mixture is taken from the fire and is allowed to cool for twelve hours, after which the same is ready for use.

From the foregoing description, it can be seen that I have provided a novel compound for belt dressings which will be easy to make and cheap to place on the market.

Changes in the details may be made without departing from the spirit or scope of this invention, but:—

What I claim as new is:

1. A belt dressing comprising one quart of extra heavy lubricating oil, two pounds of rosin and three ounces of bees wax.

2. A compound for belt dressing consisting of one quart of lubricating oil, two pounds of rosin and three ounces of bees wax, the oil being allowed to boil until the bees wax and rosin are dissolved, and the entire mixture foams, and then allowing the mixture to cool for twelve hours.

In testimony whereof I affix my signature.

ADAM GONDERMAN.